Feb. 9, 1943.                O. H. BANKER                2,310,203
            AIR FILTER SYSTEM FOR MOTOR AND CLUTCH UNITS
                    Filed Nov. 15, 1940        2 Sheets-Sheet 1

Inventor:
Oscar H. Banker

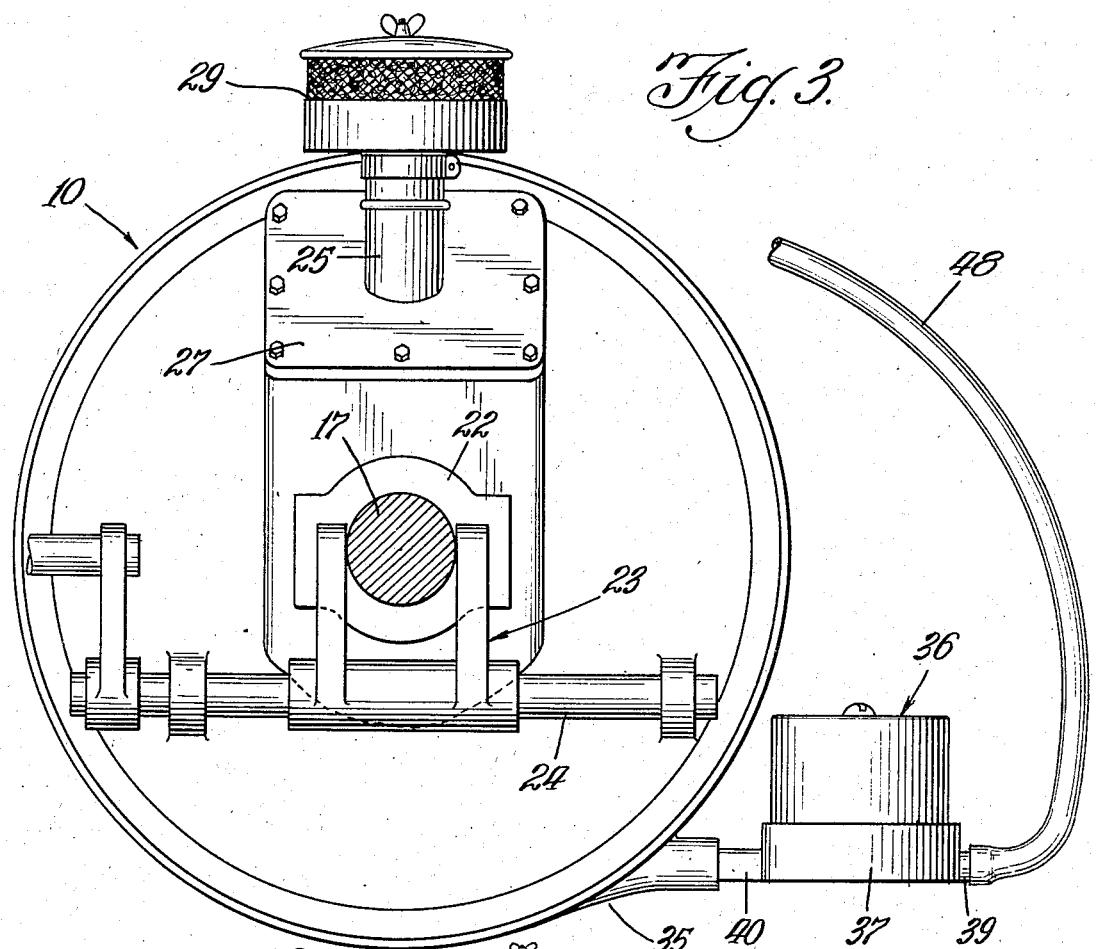
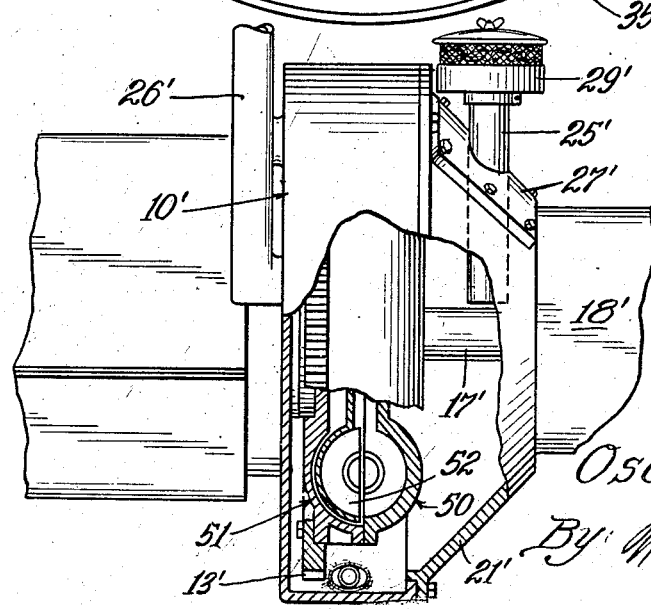

Patented Feb. 9, 1943

2,310,203

UNITED STATES PATENT OFFICE 2,310,203

AIR FILTER SYSTEM FOR MOTOR AND CLUTCH UNITS

Oscar H. Banker, Chicago, Ill., assignor to New Products Corporation, Chicago, Ill., a corporation of Delaware Application November 15, 1940, Serial No. 365,742

5 Claims. (Cl. 192—113)

This invention has to do with air filters for internal combustion engines and relates particularly to a system and apparatus that includes and passes the air through the casing of a clutch associated with an engine, for cooling the clutch.

My invention is particularly useful upon engine driven vehicles, though not restricted to this use, and a cardinal object thereof is the provision of a novel air filter system and structure that employs a clutch and its housing as a centrifuge for separating foreign particles from the combustion air prior to introduction into the engine.

Another object of the present invention is the provision of a structure as the above in which the air is caused to flow over and about the clutch for cooling the same.

A further object of this invention is the provision of a structure as the above which is especially suited to and employs a fluid coupling as the rotating element of the centrifuge.

A still further object is the provision of a new by-pass and dirt trap serving as scavenging means for the clutch casing.

These and other desirable objects encompassed by and inherent to the invention will later appear.

In the drawings:

Fig. 3 is a transverse elevational view taken substantially upon the line 3—3 of Fig. 1; and Fig. 4 is a view taken similarly to Fig. 1 but illustrating the invention as it may be applied to a housing which encloses a fluid coupling.

Figure 1:
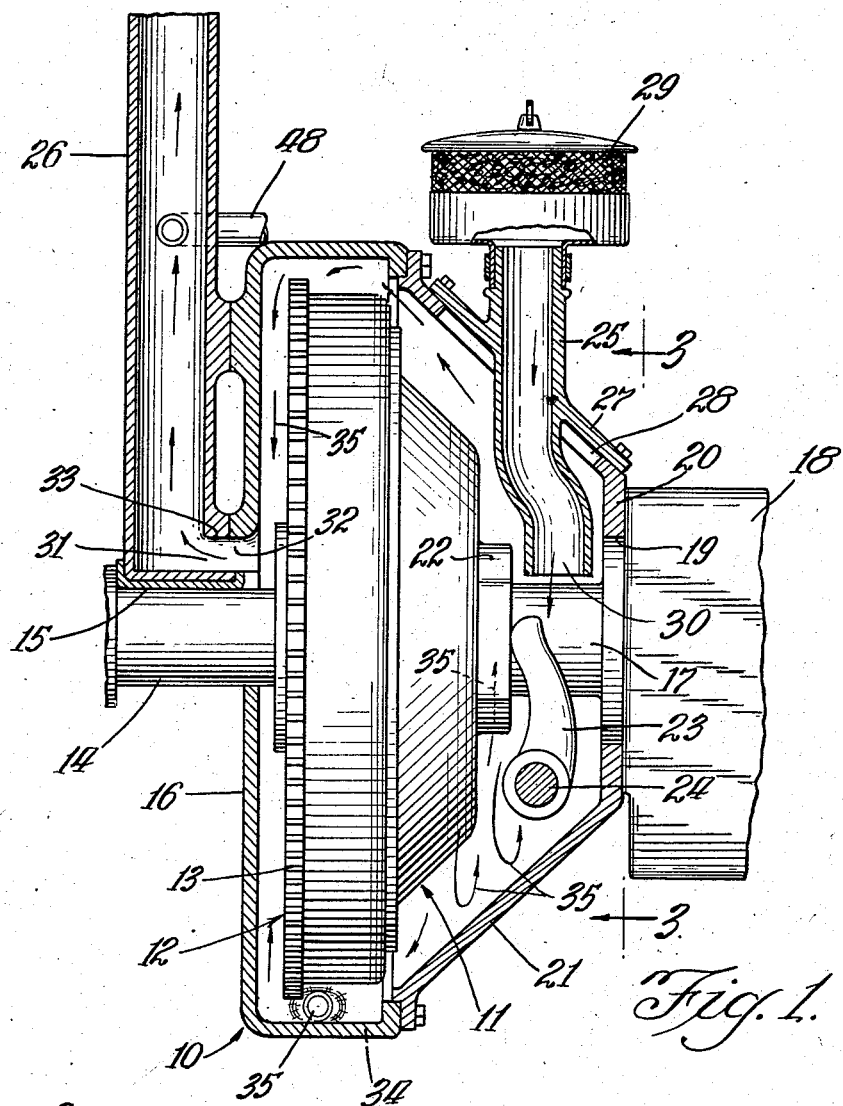
Fig. 1 is a longitudinal sectional view of a clutch housing and associated parts embodying the present invention.
Figure 2:
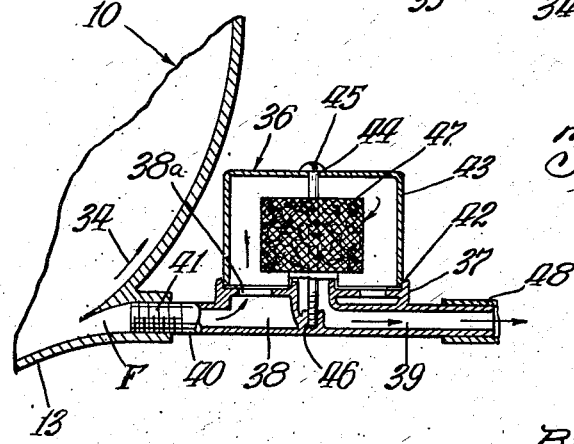
Fig. 2 is a vertical section view taken through a dirt trap disposed in series with one of the conduit lines of the filter structure.

Referring now to the drawings, and particularly to Figs. 1, 2 and 3, there will be seen a clutch housing 10 in which there is a friction clutch 11. The driving element of this clutch 11 includes the usual flywheel 12 having a starting gear 13 about its edge. Said flywheel is connected in driving relation with an engine crankshaft 14 of which a rear section is journalled at 15 in the front wall 16 of the casing or housing 10. A drive shaft 17 for transmission gearing within a gearbox 18 is connectible in driving relation with the shaft 14 by the clutch 11, said shaft 17 fitting closely within an opening 19 within a flanged portion 20 of the bell-shaped housing wall 21. A throw-out bearing 22 for the clutch 11 is actuatable by a yoke 23 upon a cross shaft 24 in the usual manner.

An air intake line for the engine and its carburetor (not shown) includes an intake duct 25, the clutch housing 10 and a transfer duct 26 which leads to said carburetor, there being a passage 31 effected by axially aligned openings 32 and 33 respectively in the housing front wall 16 and the inner end of the duct 26. The intake duct 25 has thereon a diagonal flange or plate member 27 which serves as a cover plate for an access opening 28 in the upper side of the wall 21. A filter unit generally designated 29, and which may be of any standard construction, filters the air as it passes into the duct 25 and it will be noted that said duct is sufficiently long for its inner end 30 to discharge adjacently to the shaft 17 and the principal axis of the clutch housing.

In the operation of the device, the air drawn by the engine inwardly through the filter unit 29 and the intake conduit 25 is introduced into the clutch housing at a central position between the front wall of this housing and the front wall of the clutch 11 and is caused to flow radially outwardly of the housing where it passes between the circular side wall 34 of said housing and the clutch, and thence radially inwardly between the front wall 16 of the housing and the front wall of the clutch and outwardly of the housing through the aforesaid passage 31. Due to the frictional engagement with the rotating clutch and flywheel the air within the clutch housing forms a vortex which reverses sharply at the circular wall 34 whereby any foreign particles contained in the air will be thrown centrifugally against this wall. The path taken by the air is illustrated by the arrows 35. Thus the clutch and flywheel together with the clutch housing serve as a centrifuge.

An accumulation of the foreign dirt particles upon the circular wall 34 is prevented by causing their removal into a dirt trap generally designated 36 in Figs. 2 and 3. Said trap 36 comprises a base member 37 having an inlet passage 38 and an exhaust passage 39. An extension 40 of the inlet passage 38 is threaded at 41 for connection with an internally threaded and contracted section of a flume F which leads tangentially from the circular housing wall 34. A circular flange 42 upon the base member 37 forms a seat for the lower edge of a cap 43 which has a central opening 44 through which a long screw 45 is passed and turned into threaded relation with an internally threaded boss 46 upon the lower side of the exhaust passage 39. This cap 43 together with the base member 37 forms a chamber which is communicative with the inlet passage 38 through a plurality of openings 38a. Said screw 45 descends through a filter head 47 which is suitably secured on and about the inner end of said exhaust passage 39. A conduit 48 connects the exhaust passage 39 with a section of the transfer conduit 26 as illustrated in Fig. 1.

Because of the inertia of the air and the vortex thereof created within the clutch housing 10, the air pressure will be greater adjacently to the circular wall 34 than at more central sections of the housing where, for example, the air is introduced through the intake duct 25 and discharged through the outlet passage 31. Furthermore, there will be a pressure drop in the direction of flow of this stream of air so that static pressure at the flume F will exceed the static pressure at the point in the transfer duct 26 where the conduit 48 makes its connection. Consequently while the flywheel and clutch are rotating to create the aforesaid vortex there will be a constant flow or transfer of air through the dirt trap 36 and the conduit 48 into the transfer conduit 26 although the amount of air transmitted through this bypass will be small compared to the air introduced into the duct 26 through the passage 31. As the centrifugally separated particles are whirled about the wall 34 they are caught by the flume F from which they are carried by the by-pass air stream through the passage 38 and openings 38a into the dirt trap 36 where they are retained by the filter head 47. The dirt particles thus collected in the trap 36 may be periodically removed by simply removing the screw 45 and the cap 43 and thereafter wiping or otherwise discharging the particles from the filter member 47.

Quite obviously this filtering system, in addition to being efficient, provides a constant stream of air against the surface of the clutch and flywheel for cooling these parts. Such cooling of the clutch is of particular importance in truck and tractor installations where clutch engagement under heavy loads is frequently necessary.

In Fig. 4 the invention is embodied within a clutch housing that contains a fluid coupling in contradistinction to the friction clutch illustrated in the Figs. 1 and 2. The fluid coupling is designated 50 and comprises a driving member 51 and a runner or driven member 52 of any standard construction.

It should be understood that the invention is not limited to the specific forms or environment herein illustrated, but extends to other arrangements, details and structures falling within the spirit of the invention.

I claim:

1. In a motor and clutch assembly, a clutch housing comprising an end wall in opposed spaced relation with an end of said clutch and a substantially circular side wall disposed spacedly about and substantially coaxially with said clutch, and an air intake line for said motor comprising a transfer duct communicating between said motor and an interior portion of said housing between said clutch end wall and said housing end wall spaced radially inwardly a substantial distance from said circular side wall, and an intake air duct communicating with an interior portion of the clutch housing at the opposite end of the clutch.

2. In a motor and clutch assembly, a clutch housing comprising opposite end walls and a substantially circular side wall between said end walls, an air intake line for said motor comprising a transfer duct communicating between said motor and the interior of said housing at a section adjacently to one of said end walls and centrally of said circular wall, and an air intake duct communicating with the interior of said housing at a section adjacently to the other end wall and also centrally of said circular wall, whereby the air entering the housing will stream radially outwardly over one end of a clutch in the housing and radially inwardly over the opposite end of said clutch to conduct heat from both ends thereof.

3. In a motor and clutch assembly, a clutch housing comprising opposite end walls and a substantially circular side wall disposed about and substantially coaxially with said clutch, and an air intake line for said motor comprising a transfer duct communicating between said motor and said housing at a central section of one of said end walls, an intake air duct communicating with said housing at a section of the other end wall, filter means in series with said intake air duct, and an auxiliary duct including filter means in series therewith and communicating between a section of said circular wall and said transfer duct.

4. In a motor and clutch assembly, a clutch housing comprising opposite end walls and a substantially circular side wall disposed about and substantially coaxially with said clutch, and an air intake line for said motor comprising a transfer duct communicating between said motor and said housing at a central section of one of said end walls, an intake air duct communicating with said housing at a section of the other end wall, filter means in series with said intake air duct, a flume leading tangentially from said circular wall, an auxiliary duct communicating with said transfer duct, and dirt trap duct means disposed between and providing communication between said flume and said auxiliary duct.

5. In a motor and clutch assembly; a clutch including coaxial relatively rotatable driving and driven parts; a housing in which said clutch is rotatable and including end walls respectively in opposed spaced relation with the ends of said clutch and a substantially circular side wall disposed about in spaced relation with and substantially coaxially with said clutch and an air intake line for said motor comprising a transfer duct communicating between said motor and said housing at a central section of the space between the clutch and one of said end walls, and an intake air duct communicating with said housing at a central section of the space between the clutch and the other end wall.

OSCAR H. BANKER.